July 21, 1959

F. VAN MARLE 2,895,588

MAIL FACING MACHINE

Filed June 4, 1956

INVENTOR.
FREDERICK VAN MARLE
BY

July 21, 1959  F. VAN MARLE  2,895,588
MAIL FACING MACHINE
Filed June 4, 1956  13 Sheets-Sheet 7

INVENTOR.
FREDERICK VAN MARLE
BY

July 21, 1959

F. VAN MARLE 2,895,588

MAIL FACING MACHINE

Filed June 4, 1956

INVENTOR.
FREDERICK VAN MARLE
BY

July 21, 1959 F. VAN MARLE 2,895,588
MAIL FACING MACHINE

Filed June 4, 1956 13 Sheets-Sheet 12

INVENTOR.
FREDERICK VAN MARLE
BY

FIG. 17

United States Patent Office 2,895,588
Patented July 21, 1959

2,895,588
MAIL FACING MACHINE

Frederick Van Marle, The Hague, Netherlands, assignor to N.V. Technische Maatschappij Marchand-Andriessen, The Hague, Netherlands, a Dutch limited-liability company Application June 4, 1956, Serial No. 589,102

11 Claims. (Cl. 198—33)

This invention relates to mail handling equipment and has for its object to provide an improved machine for facing, cancelling and stacking letters.

More particularly it is an object of this invention to provide a machine having a table portion upon which letters may be placed and from which the letters may be fed therethrough singly, the machine having means for rotating the letters about a vertical or horizontal axis, when necessary, so that the stamp will always appear, finally, at the same side and the same corner of the mail piece.

Another object of the invention is to provide a machine comprising essentially a plurality of tandem conveyors, all timed to transport mail pieces at a constant speed, said conveyors having the respective functions of feeding a supply of mail pieces, rotating the mail pieces or not through a vertical arc, transport of the pieces to a second rotational conveyor, rotating the pieces through a horizontal arc or not, and conveying the pieces past a stamp cancelling device or, selectively, through a deflecting gate in case cancelling is not required.

An important object is to provide conveyors for the rotational operations such that the mail pieces will be positively gripped during these operations.

Another object is to provide stamp detection devices which may be in the form of photocells or any other device which may detect the stamp, the devices being placed in front of each of the rotational conveyors for the control of relays, the relays controlling the action of the rotational conveyors with respect to each mail piece being transported thereby. Other detection devices scan the mail pieces after they leave the rotational conveyors and control a relay which deflects the mail pieces or not, as they are being transported past the canceling device.

Other objects include reliability of operation over long periods of time, ease of maintenance, a construction allowing for replacement of sub-assemblies and comparative simplicity of construction so that the machine may be built at minimum cost.

Other objects and advantages will become hereinafter more fully apparent as reference is had to the accompanying drawings in which my invention is illustrated and in which:

Figure 1:
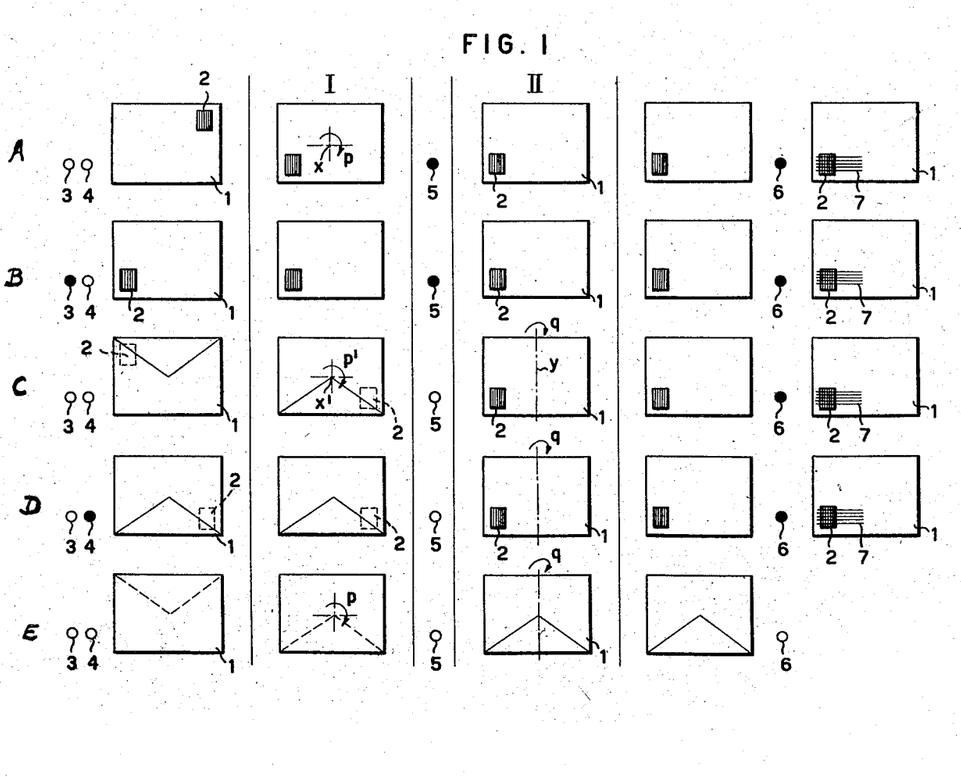
Figure 1 schematically illustrates the operation of the apparatus insofar as it affects a mail piece travelling therethrough, Figures 2a and 2b together show a side elevation of the facing machine.

Figure 1 schematically illustrates the purpose of the invention. Mail pieces 1 having a stamp 2 may initiate their path through the apparatus in any one of the positions A to E inclusive. In position A the stamp 2 is on the front side in the right upper corner of the mail piece 1. From this position said mail piece 1 passes two detection devices such as photoelectric cells 3, 4 during transport in the machine. One cell 3 is mounted at the front side and the other one 4 at the back side of the piece 1. These cells scan a path along the bottom part of the mail piece. Consequently in case A the cells 3, 4 do not detect the stamp 2. Now the mail piece is taken by a conveyor I to be described later on. In this apparatus, because the photocells did not detect a stamp, the piece is turned 180° about its horizontal axis shown at x in Figure 1 in the direction of arrow p so that the stamp 2 is now found in a position in the left lower corner of the mail piece. Then a further detection device 5 scans the front of the mail piece 1 and detects the stamp. The consequence thereof is that the mail piece in the same position passes the conveyor II to be described hereinafter. Leaving said conveyor II, again a detection device 6 scans the mail piece 1. This device 6 may actuate a change direction device or gate analogous to the switches of railways, so that the mail piece 1 may be side-tracked into a receptacle or fed to the marking device. In this example the mail piece, since it has a stamp, passes to the marking device and will be impressed with a postmark 7.

Now considering a mail piece entering the machine in the position of B, it is seen that the stamp 2 is at the front left lower corner. Now the detection device 3 detects the stamp and the consequence thereof is that the mail piece 1 passes the conveyor I in the same position. It then passes the cell 5, which also detects the stamp and enables the mail piece to enter and to pass conveyor II in the same position. Finally the piece is scanned by cell 6, which allows it to be transmitted to the marking device.

As to position C, it is seen that the stamp 2 is at the back side left upper corner. Neither cell 3 nor cell 4 detects a stamp. Hence the mail piece 1 in conveyor I is turned about horizontal axis $x'$ in the direction of arrow $p'$. Then stamp 2 is still at the back side but now in the right lower corner. Consequently cell 5 does not detect the stamp. The consequence thereof is that the mail piece 1 is turned about its vertical axis Y in the direction of arrow $q$ in the conveyor 2. This means that the stamp 2 is brought to the front side in the left lower corner. Cell 6 detects the stamp and allows the piece to be transmitted to the marking device.

In position D the stamp 2 is again at the back side but is now in the right lower corner. Cell 4 mounted at said back side now detects the stamp. The mail piece therefore passes conveyor I in the same position. Cell 5 does not detect the stamp therefore the mail piece is rotated about its vertical axis bringing the stamp to the lower left hand corner. The cell 6 detects the stamp so that the mail is transmitted to the cancelling device.

Position E shows a mail piece without a stamp so that cells 3 and 4 do not detect anything. In conveyor I the piece is turned about its horizontal axis. Cell 5 does not detect anything, which causes the mail piece 1 to be turned in the conveyor II about its vertical axis. Cell 6 does not detect anything and the consequence thereof is that the mail piece 1 is deflected and does not pass the marking device.

Figure 2A:
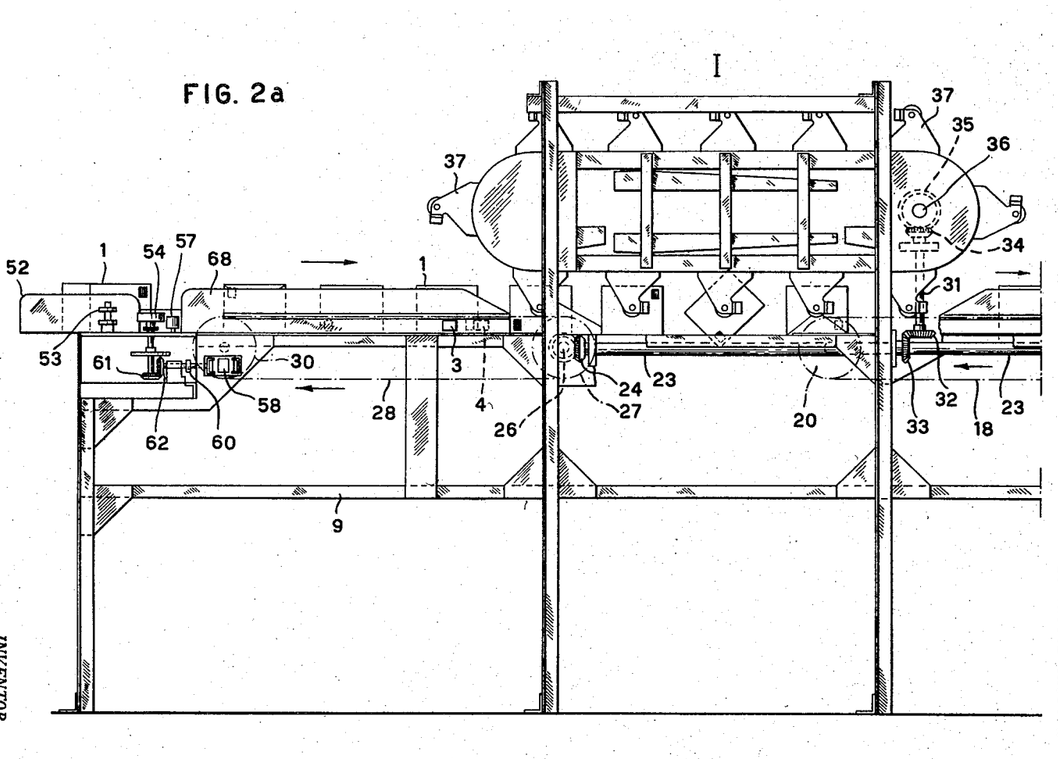
Figure 2B:
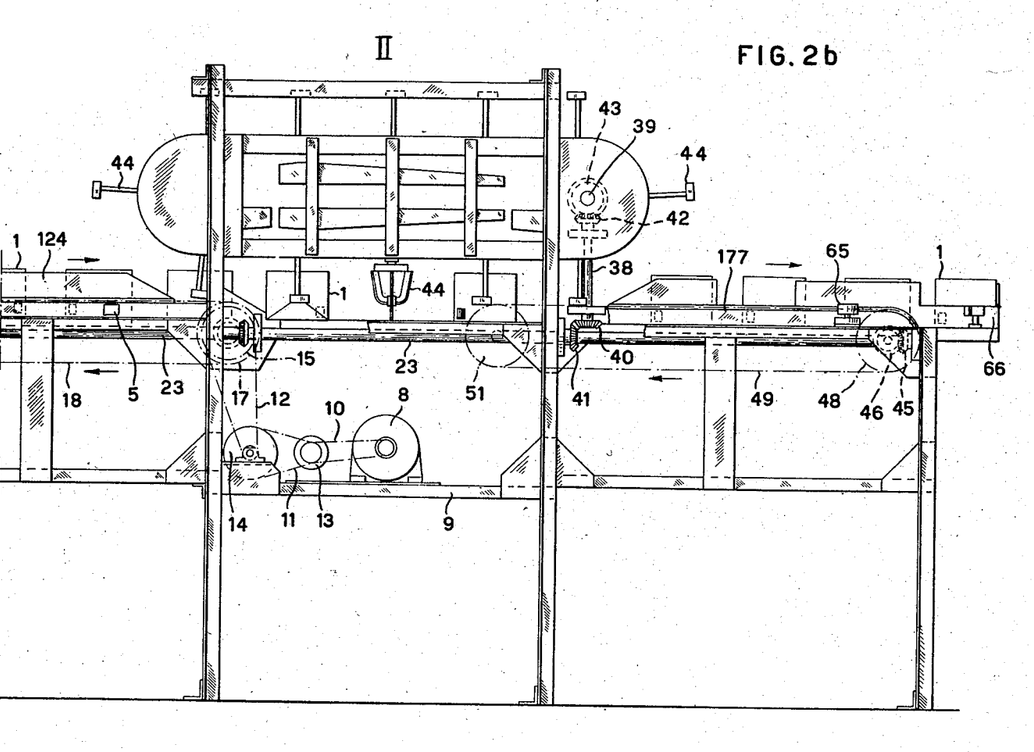
Figure 3:
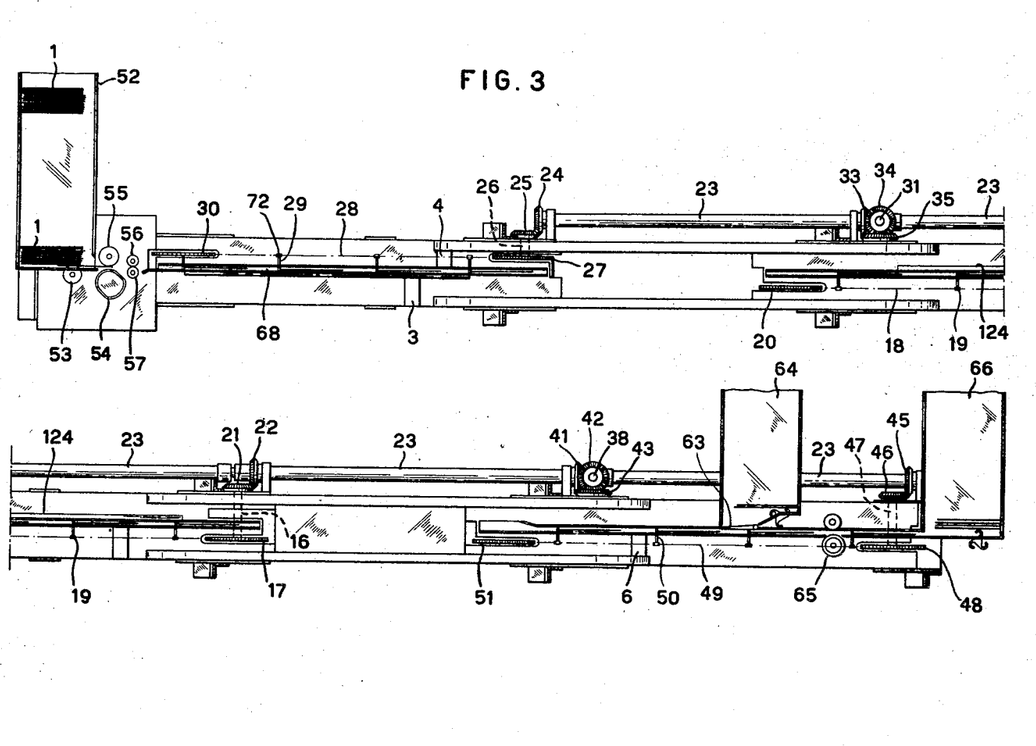
Figure 3 is a plan view, in partial section, of the machine.

Figures 2 and 3 give a general view of the machine. Here the conveyors I and II which rotate the mail pieces are only schematically shown.

The driving means and movements will be first described. An electromotor 8 is mounted in the main frame 9 and by means of belts 10, 11 and 12 and pulleys 13, 14, 15 drives a horizontal shaft 16. A sprocket wheel 17 is mounted at one end of said shaft 16 and drives a chain 18 which overrides a second sprocket wheel 20. The chain 18 is provided with fingers 19 at spaced intervals, these fingers being mail piece propelling means. The chain 18 is a part of the intermediate conveyor which transports the mail pieces from the first rotational conveyor I to the second rotational conveyor II.

At the other end of shaft 16 a mitre gear 21 is mounted, and this gear is in mesh with another gear 22 on a shaft 23, which extends practically along the entire length of the machine and from which all further motions are deduced.

A bevel gear 24 on the shaft 23 meshes with a bevel gear 25 keyed to a horizontal shaft 26. On the shaft 26 a sprocket wheel 27 is also keyed. A chain 28 provided with a plurality of spaced propelling fingers 29 over-rides the wheel 27 and a second sprocket wheel 30 located near the front end of the machine as shown also in Figure 4. This chain 28 is the propelling means of the first or feeding conveyor.

The rotational conveyor I is driven by the shaft 23, gears 32 and 33 and a vertical shaft 31 to which the gear 32 is keyed. At the other end of the shaft 31 a gear 34 is keyed and meshes with a gear 35 keyed on a horizontal shaft 36 thus forming the drive for the conveyor I.

As the drive for the second rotational conveyor II a second vertical shaft 38 is connected to the shaft 23 by the gears 40 and 41. This shaft carries a gear 42 on its upper end in mesh with a gear 43 mounted on a horizontal shaft 39. By means of the shaft 39 the carriages 44 are continuously moved in an endless path to form the conveyor II.

The end of shaft 23 at the rear of the machine is provided with a gear 45, which through gear 46 and shaft 47 drives a sprocket wheel 48 over which rides a chain 49 with propelling fingers 50. This chain also over-rides a second sprocket wheel 51 to form the conveyor which transports the mail pieces after they have been faced.

Figure 17:
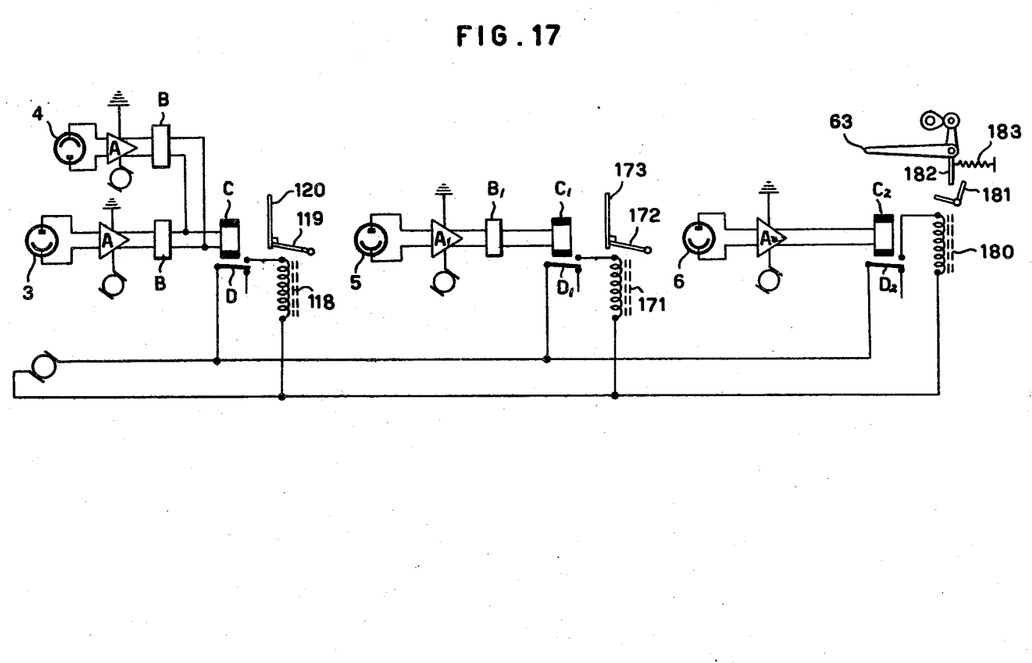
Figure 17 is a diagram showing the electrical circuit for actuation of the carriers in response to detection of the stamp.

The mail pieces 1 pass the machine from left to right according to a straight line and with constant speed. They arrive in a supply chamber or chute 52 and are disposed here in an arbitrary manner, so that all possibilities A–E inclusive according to Figure 1 may occur. From this chute 52 they are brought in the path of the fingers 29 of the chain 28 by means of a separator device which feeds the mail pieces one by one. This known apparatus substantially comprises rotating rollers 53, 54, 55, 56, 57 which are driven by a worm gear 58 in mesh with a worm gear 59 (Figure 4), a shaft 60, and conical gears 61 and 62. Since the separator is not claimed per se it is not shown in full. During advancing of the chain 28 the mail pieces pass photocells 3 and 4, then they come to conveyor I, where they may be turned about their horizontal axis. Subsequently they again come in the path of the fingers 19 of the chain 18, which bring them past photocell 5 and to the conveyor II, where they may be turned about their vertical axis. Then the mail pieces come in the path of the fingers 50 of the chain 49. They pass photocell 6 where they may be deflected by means of gates 63 into the delivery chute or stacker 64 for unstamped or metered pieces. Or they go straight through to the cancelling device 65 and are thereafter delivered into the chute or stacker 66. The circuit is shown at the right side of Figure 17 where the photocell 6 is seen in position to send an electrical signal to the amplifier $A_3$ which energizes a solenoid $C_2$. This solenoid closes the switch $D_2$ thus energizing the circuit to the relay 180. The relay 180 closes the switch thereabove which actuates the arm 181 to move the pendant arm 182 of the switch 63 against the resistance of the spring 183.

Figure 4:
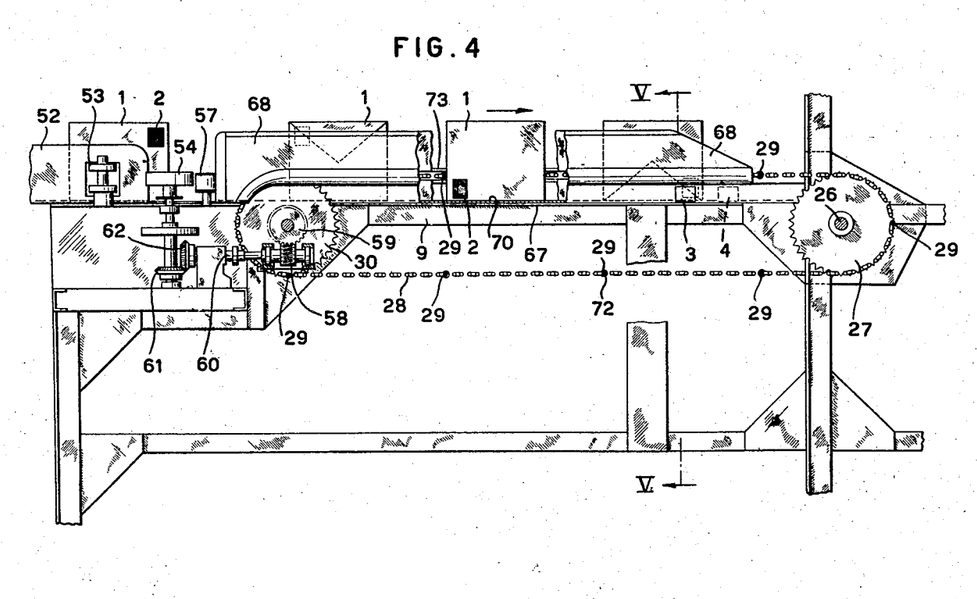
Figure 4 shows the feeder and the first chain conveyor, in side elevation.
Figure 5:
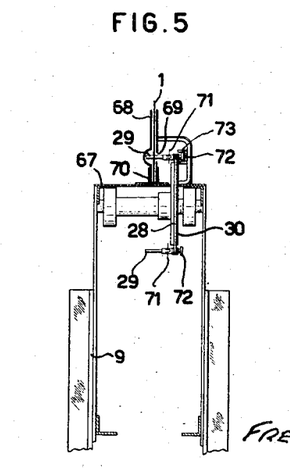
Figure 5 is a transverse vertical section taken along the line V—V of Figure 4.

Figures 5 and 4 best show the construction of the first or feeding conveyor. The upper flight of the chain 28 runs parallel to the table 67 of the frame 9. On the frame 9 is a trough-like mail piece guide 68 having a slot 69 along its entire length at a height such that the fingers 29 may enter the trough thereby to propel a mail piece in the path thereof. The opposite wall of the trough is indented to receive the outer ends of the fingers. The fingers 29 each has a flexible joint 71 intermediate its length to permit yielding when necessary to prevent breakage. Each finger, while anchored in the chain 28 extends therethrough and carries a roller 72 on the end thereof. These rollers ride in a guide 73 supported by brackets arising from the table 67 which also support that part of the guide 68 immediately above the slot. The guide 73 thus insures the fingers against contact with the edges of the slot. The fingers 29 convey the mail pieces past detection devices 3 and 4 and to a point where they may be grasped by the carriages of the conveyor I.

Referring now to Figures 6 to 10, twin hexagonal plates 74 are keyed on the horizontal shaft 36. In their angle points recesses 75 are provided so that the plates 74 can function as a kind of sprocket wheel. The carriages 37 each have two parallel shafts 77 and 78 (Figure 9) with rollers 76 rotatably mounted on each end of each shaft. The shafts are connected by rigid attachment to carriage frame members 90. Outwardly of the rollers 76 ball bearings 80 are mounted on the ends of each shaft thus forming the running gear of each carriage. Each running gear is spaced from and connected to the running gear of each adjacent carriage by links 79 which are equal in length to the spacing of the shafts 77 and 78. The continuous movement, in an endless path, of the carriages takes place in the direction of the arrow $r$ upon counter-clockwise rotation of the hexagonal plates 74 by reason of the rollers 76 engaging the depressions 75.

Figure 6:
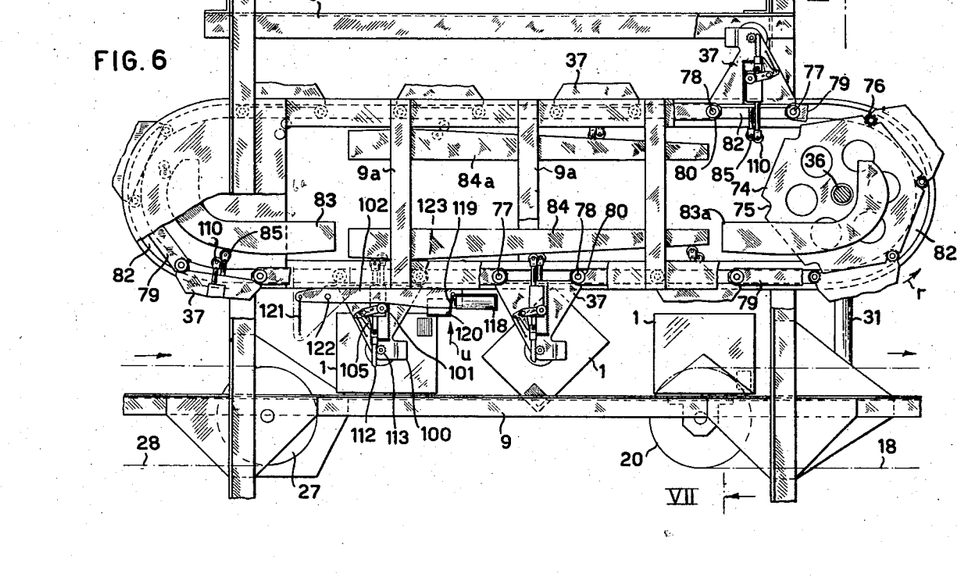
Figure 6 is an enlarged side elevation of the first rotational conveyor I of Figure 2.
Figure 7:
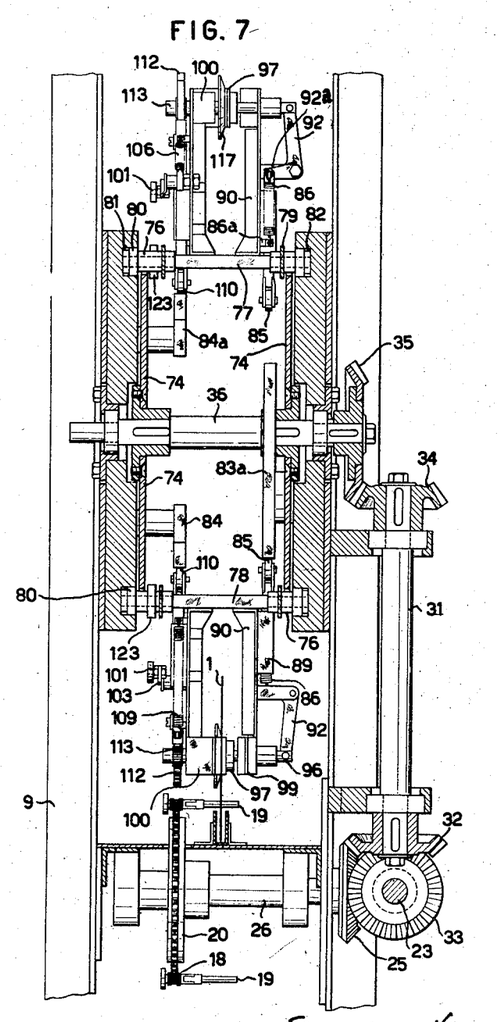
Figure 7 is an enlargened transverse vertical section taken along the line VII—VII of Figure 6.
Figure 8:
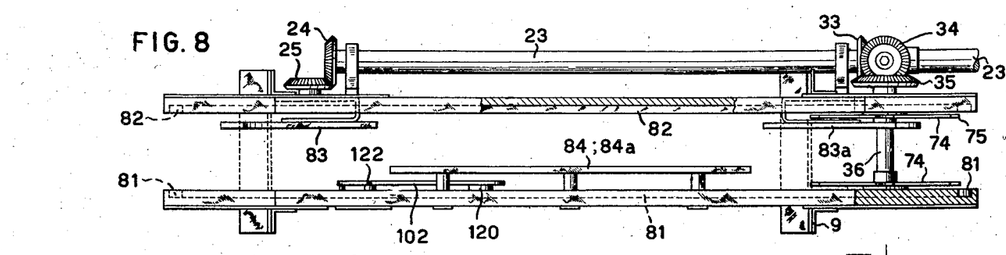
Figure 8 is a top plan view of Figure 6, partially in section and without the conveying members.
Figure 9:
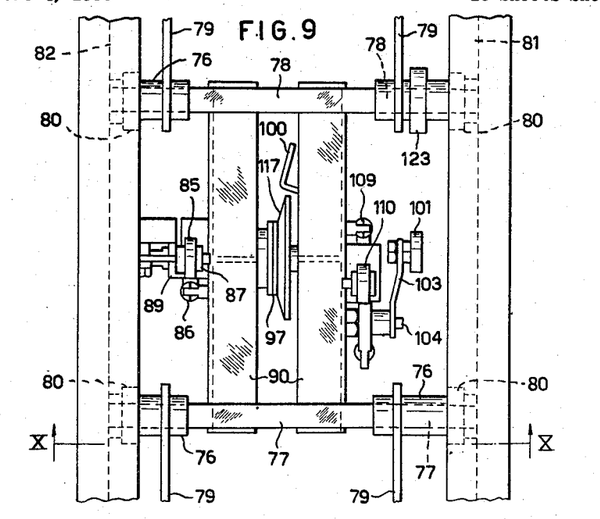
Figure 9 is a plan view of a carriage of the conveyor shown in Figure 6.
Figure 10:
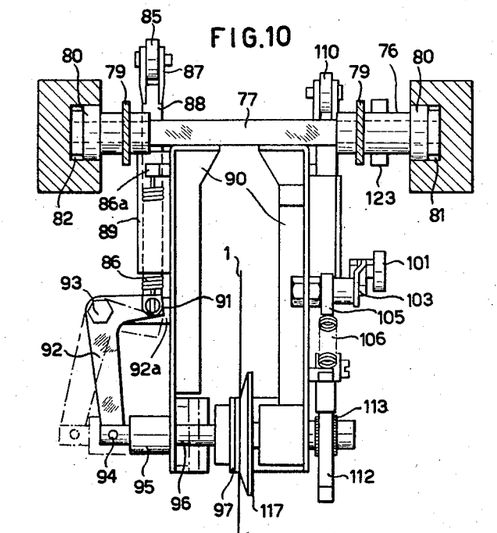
Figure 10 is a vertical section taken along the line X—X of Figure 9.

For guiding the carriages 37 the ball bearings 80 at the ends of the shafts 77, 78 are guided in tracks 81 and 82, which extend along the entire length of the conveyor and rigidly attached to the frame 9, so that the ball bearings follow these tracks throughout their entire path.

Within the conveyor fixed cam members 83 and 83a are mounted on the frame members 9a for causing gripping and releasing of the mail piece 1, whereas fixed cam members 84 and 84a serve to cause the clamping means to rotate about its horizontal axis, as will now be described with reference to Figures 9 to 12.

Opening and closing of the mail piece clamping members takes place by the movement of a roller 85 against the action of a spring 86 anchored at its upper end to a bracket 86a extending out from the frame 90 of the carriage 37.

For this purpose the roller is mounted at the fork-shaped end 87 of a stud 88, which by means of a guide 89 is retained and guided on frame 90 of carriage 37. The other end of the stud 88 at 91 is connected with the spring 86 and with a bell-crank lever 92 pivoted at 93 on a bracket 92a extending outwardly from the carriage frame 90. Lever 92 is connected at 94 with a guiding shaft 96, which extends through a sleeve 95 secured to the frame 90. On said shaft 96 the clamping member 97 is rotatably mounted by means of a ball bearing 98 (see Figure 12). Now as the roller 85 is moved downwardly in its guide 89, it actuates the lever 92 and shaft 96 so that the clamping member 97 moves to the left (Figure 10) away from the opposite clamp member 117 so that a mail piece 1 may enter between the clamps. To facilitate the entry, catching arms 99 and 100 are provided (see Figure 12).

When roller 85 has passed the cam member 83 (Figure 6) the clamping member 97 is closed against the clamp member 117 through the action of spring 86. When the roller 85 passes into contact with the cam member 83a, the latter again urges roller 85 in downward direction, so that the mail piece 1 is released and taken over by chain 18.

The turning of the mail piece about its horizontal axis is done as follows: A releasing roller 101 is contacted by a rocking cam member 102 (Figure 6). Roller 101 (Figure 11) is forced downwardly so that through lever arm 103 and shaft 104, a pawl 105 against the action of a spring 106 releases a shoulder latch 107 on a rod 108 thus permitting the rod to rise by the contracting action of a spring 109 anchored at its top to the frame 90 and at its bottom to a bracket 108a carried by the rod 108. At the upper end of the rod 108 a roller 110 is mounted, which can now start following the cam member 84 which is fixedly mounted on the frame 9a as shown in Figure 6.

Figure 11:
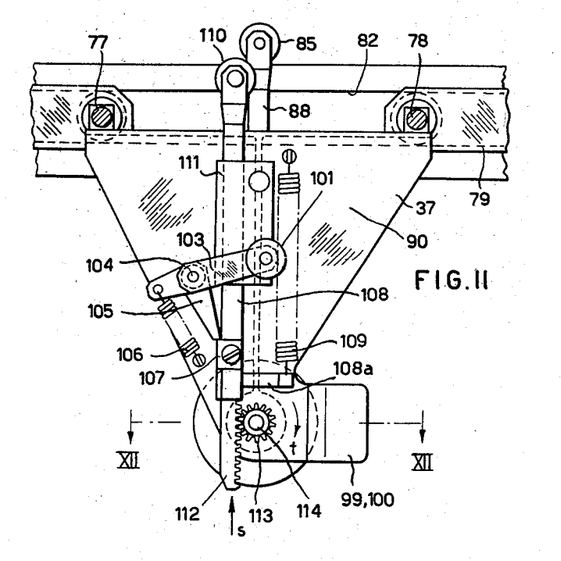
Figure 11 is a side elevation of the carriage shown in Figures 9 and 10.
Figure 12:
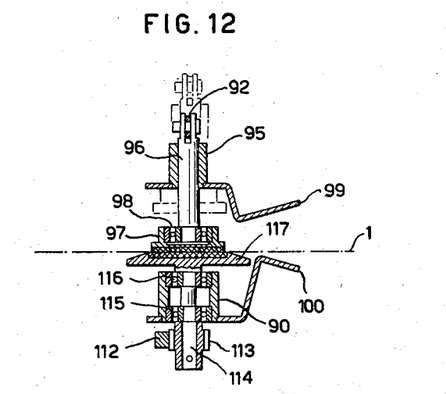
Figure 12 is a horizontal section taken along the line XII—XII of Figure 11.

The rod 108 is movable in a guide 111 secured to the carriage frame 90 and has mounted at its lower end a rack 112 in mesh with a pinion 113. The pinion 113 is mounted on a shaft 114 which is rotatable in bearings 115, 116, the outer races of which are secured to the frame 90 as seen in Figure 12. On shaft 114 the clamping member 117 is mounted which cooperates with the opposite clamping member 97. As mentioned before, the roller 110 follows the surface of the cam member 84 after its release by the pawl 105. The rack therefore moves upwardly (arrow s) as seen in Figure 11, so that pinion 113 rotates (arrow t) the shaft 114 and the clamping member 117.

The mail piece 1 clamped between the members 97, 117 is thus rotated because the clamping member 97 can rotate on its shaft 96 by reason of its bearing 98 and consequently rotates with the rotation of the clamping member 117.

Figure 1 illustrates that it is also possible that the mail piece need not be turned. In this case (see Figures 1B, 6 and 17) the photocell 3 or 4 passes an electric signal to an amplifier A which energizes the solenoid C through holding relays B. The solenoid C actuates the switch D thus closing the circuit which energizes the relay 118. A locking member 119 is moved and releases a latch 120 which was holding the rocking arm 102 in the position illustrated. Release of the latch permits the cam member 102 to be rocked about the pivot 122 by the tension of the spring 121, out of the path of the roller 101.

Now, roller 101 can not be pressed downwardly by arm 102 so that rack 112 remains locked. Consequently the mail piece is not rotated. Due to the fact that the spring 121, through the rocking member 102, exerts pressure on the other latch member 119 in the direction of arrow u, the latter resists the energizing of the relay. In order to eliminate this resistance, a roller or ball bearing 123 is mounted on each shaft 78, which has such dimensions that it contacts the arm from above and as one of these rollers passes on top of the cam 102 it urges the cam member downwardly thus releasing the latch member 119 so that the latter may be moved without resistance by the relay.

As explained, in those carriages 37 which have rotated their mail pieces, the ratchet 112 and the roller 110 on the end thereof will be in uppermost position whereas in those that did not rotate their mail piece the shaft will be in its original or latched position. In order to restore the carriages to their original position after they release their mail piece onto the chain conveyor 18, I provide a cam piece 84a which is fixed to the frame 9a and which is in the path of each roller 110 during the travel as a part of the upper flight of the conveyor. If a roller 110 is in extended position it will be forced by this cam member to retract against its spring 106 until the latch member 105 engages the shoulder 107.

Figure 13:
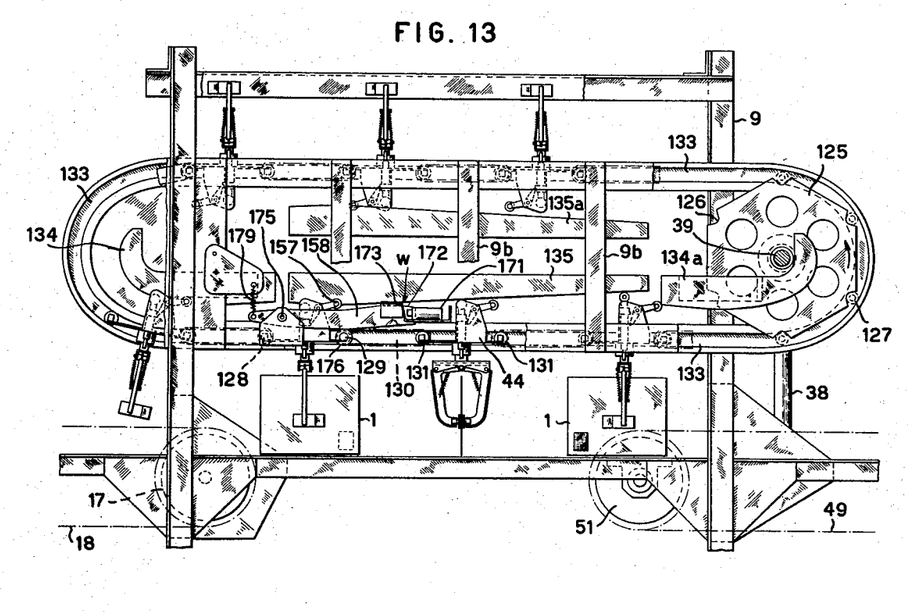
Figure 13 is an enlargened side elevation of the second rotational conveyor II of Figure 2.
Figure 14:
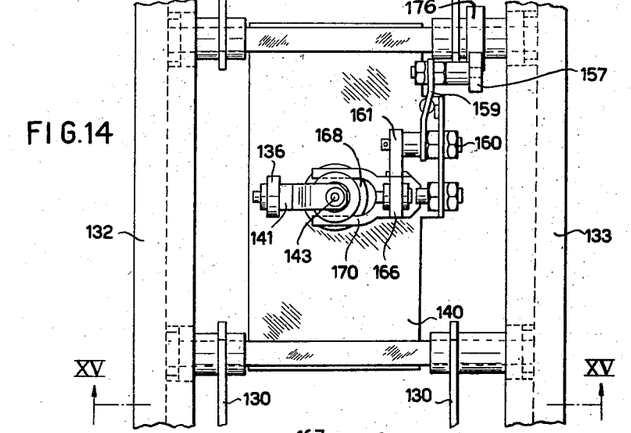
Figure 14 is an enlargened plan view of a carriage of the conveyor shown in Figure 13.
Figure 15:
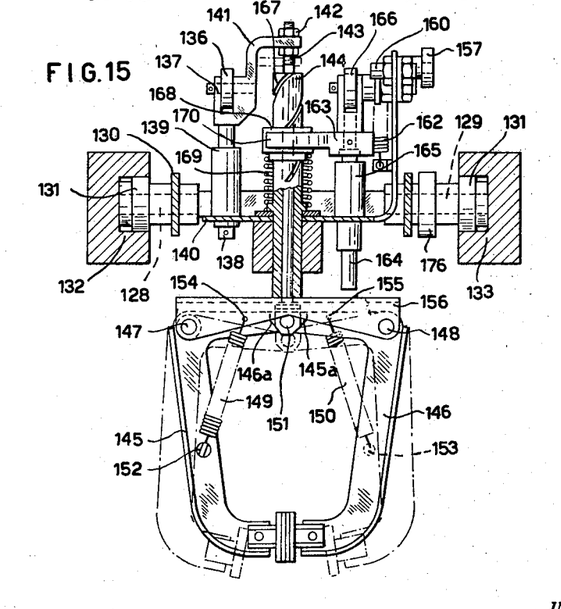
Figure 15 is a vertical section taken along the line XV—XV of Figure 14.
Figure 16:
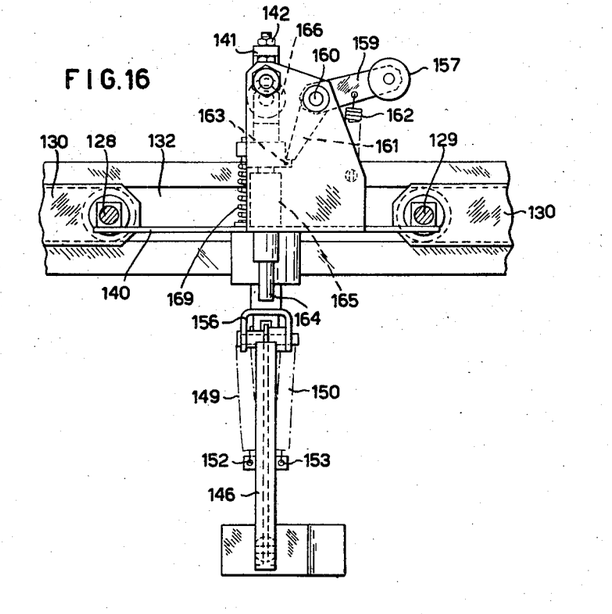
Figure 16 is a side elevation of the carriage shown in Figure 15.

After passing photocell 5 under propulsion by the chain 18 and fingers 19 the mail piece 1 comes to conveyor II. The endless movement of the conveying means 44 in the conveyor II is also derived from twin hexagonal plates 125 (Figure 13) keyed onto the driven shaft 39. Upon rotation of these plates in the direction of arrow p, rollers 127 of the carriages 44 engage recesses 126 in the plates. The carriages 44 comprise shafts 128 and 129 on which rollers 127 rotate. Links 130 connect the carriages 44 so that the chain is formed in which the plates 125 function as sprocket wheels. For guiding the carriages 44 ball bearings 131 are mounted on the ends of each of the shafts 128, 129 said bearings being guided in guides 132 and 133 which extend along the entire length of conveyor II and secured to the frame 9 so that the bearings 131 may permanently follow said guides. Within the conveyor II and secured to frame members 9b thereof are placed fixed cam members 134 and 134a which cause the carriages 44 to grip and to release the mail piece 1, and fixed cam members 135 and 135a which cause the carriages to rotate their mail piece 1 about its vertical axis. This operation is explained with reference to Figures 13–16.

A roller 136 is rotatable in the forkshaped end 137 of a rod 138 which is slidable in a guide 139 mounted on the frame 140 of the carriage 44. An extension 141 of the fork 137 is connected to a parallel shaft 143 by nuts 142. The shaft may move longitudinally in a second shaft 144.

The shaft 143 has a cap 151 over its lower end, the cap having inclined sides for operating contact with similarly inclined ends 145a and 146a of two bell-cranked shaped clamping members. The members 145, 146 are pivoted at 147, 148 and are kept in closed position by springs 149, 150. These springs are connected at 152, 153 to the clamping members 145, 146 and at 154, 155 to a U-shaped bracket 156 which is screw threaded into or otherwise rigidly secured to the bottom of the shaft 144.

When the roller 136 contacts the cam surface 134 the roller 136 will be urged downwardly and simultaneously the shaft 143 will be forced axially of the shaft 144. The cap 151 therefore, is lowered and members 145 and 146 will pivot against the action of springs 149, 150 about pivots 147, 148 so that the clamps will open and the mail piece 1 will be fed therebetween by chain 18. The guide 134 is so shaped that the clamp 145, 146 will be closed before the mail piece 1 actually arrives at the end of its propulsion by the chain 18.

When roller 136 arrives at the cam surface 134a the clamp 145, 146 will open again and the mail piece 1 is then received by the chain 49.

The turning of the mail piece 1 about its vertical axis is obtained as follows: a releasing roller 157 contacts the cam surface of the member 158 and elevates it so that (Figures 14 and 16) through lever 159 and shaft 160, a pawl 161 releases a shoulder on a collar 163 against the action of a spring 162. This member is keyed on a rod 164 guided in a guide 165 fixed to the frame 140. At its upper end rod 164 carries a roller 166. Shaft 144 is provided with a helical groove 167 with a large pitch and which extends through a sleeve 168 having lands therein in engagement with the groove 167.

The sleeve 168 is urged upwardly by a spring 169 and connected by means of a fork-shaped member 170 with rod 164, the rod 170 being integral with the member 163. Due to the fact that now pawl 161 releases the shoulder latch member 163, roller 166 under action of spring 169 moves upwardly into contact with the cam member 135. The rod 164 together with the fork-shaped member 170 is raised and so is the sleeve 168. This sleeve can not rotate because it is clamped with two flat sides between the teeth of the fork 170. The consequence of all of this is that the shaft 144 is forced to rotate together with the clamping members 145 and 146 with the mail piece 1 clamped therein.

Figure 1 demonstrates that it is also possible that the mail piece 1 should not be rotated. In this case (see Figure 1, position C, D and E and Figures 13 and 17) the photocell 5 gives a signal to an amplifier $A_1$ then to a holding relay $B_1$ and to a solenoid $C_1$. The solenoid $C_1$ actuates the switch D to closed position, thus closing a circuit which energizes the relay 171. A latch 172 is actuated and releases a latch member 173, which is connected to a rockable arm 158 which by means of spring 179 pivots clockwise about the fulcrum 175. Now roller 157 cannot be raised by the cam surface on top of the arm 158 since this surface is out of the path of the roller. Rod 164 and nut 168 remain locked and the mail piece does not rotate.

Due to the fact that spring 179, through the cam member 158 and latch member 173, exerts pressure on latch 172 in the direction of arrow w, this latch offers resistance to energization by the relay 171. In order to eliminate this resistance a roller 176 (Figures 13 and 15) is mounted on each shaft 129 of the carriages 44, said roller having dimensions such that it contacts the cam member 158 from below. Thus when passing beneath said cam member this roller urges same upwardly so that the latch member 173 releases the latch member 172 so that the latter can be attracted by the relay without resistance.

When the carriages 44 which have rotated the mail piece 1 arrive at the upper flight of the conveyor II their rollers 166 which will have been completely raised by the springs 169, find contact with the cam member 135a. The roller 166 is pressed downwardly. Latch 161 falls behind cam 163 and the initial position of the carriage is thus restored.

At the end of conveyor II when the mail piece 1 is released by carriage 44 and has been taken over by chain 49 and its fingers 50, the fingers 50 propel the mail piece through a channel 177 as described with reference to Figures 4 and 5. They now pass photocell 6, which either causes the deflection of the mail pieces 1 or permits their travel to the marking device (see Figure 3).

Various changes and alterations may be made without departing from the spirit of my invention and I therefore desire to be extended protection as defined by the scope of the appended claims.

What I claim is:

1. In a mail piece facing machine, a first conveyor for transporting mail pieces linearly, a second conveyor transporting mail pieces delivered by the first conveyor, said second conveyor having means for gripping and rotating said mail pieces and its gripping means about a horizontal axis during transport, a third conveyor transporting mail pieces and its gripping means delivered by said second conveyor and having means for gripping and rotating said mail pieces about a vertical axis during transport, and a fourth conveyor transporting the mail pieces delivered by said third conveyor linearly to a point of destination, said conveyors being so arranged that a line which intersects the vertical axes of mail pieces being rotated by said third conveyor and the horizontal axes of mail pieces being rotated by said second conveyor will longitudinally intersect the mail pieces being delivered by said first conveyor.

2. In a mail facing machine, a first conveyor transporting mail pieces individually, stamp detection means scanning the mail pieces being so transported, a second conveyor having means mechanically gripping each mail piece as it terminates its travel by said first conveyor, means responsive to said detection means causing the mechanical gripping means to rotate or not through an arc of 180° while travelling linearly, means causing said gripping means to release each mail piece after a predetermined travel therein, and a delivery conveyor receiving said mail pieces as they are released by said gripping means and transporting them to a point of destination.

3. In a mail piece facing machine, a mail piece separator, a first conveyor receiving successive mail pieces individually and transporting them linearly, a stamp detection means scanning said mail pieces being so transported, a second conveyor comprising a series of connected carriages each having timed mechanical clamping means operative to grip each mail piece as it reaches the end of its travel in the first conveyor, means responsive to said detection means causing said clamping means to rotate or not through an arc of 180° while said clamping means is being transported linearly by its carriage, timed means causing said clamping means to open after a predetermined travel, and a delivery conveyor receiving said mail pieces from said clamping means and transporting them to a destination.

4. In a mail piece facing machine, a mail piece separator, a first conveyor receiving successive mail pieces individually from said separator, a stamp detection means scanning said mail pieces being transported linearly by said first conveyor, a second conveyor comprising a series of connected carriages each having timed clamping means positively gripping one of said mail pieces as it reaches the end of its travel in said first conveyor, means responsive to said detection means causing said timed means to rotate said mail piece or not about a horizontal axis while continuing its transport linearly, timed means opening said timed clamping means after a predetermined travel, a third conveyor also comprising a series of connected carriages each having timed clamping means positively gripping one of said mail pieces after it leaves the second conveyor, a second stamp detection means scanning said mail pieces between said second and said third conveyors, and means responsive to said second detection means causing said clamping means to rotate said piece or not about a vertical axis while continuing its transport linearly in said third conveyor, means responsive to the travel of said carriages for a predetermined distance with its mail piece causing said clamping means to open, and means delivering the mail piece to a destination.

5. In a mail facing machine, a separator feeding mail pieces individually to a first conveyor, stamp detection means scanning said mail pieces while in transit by said first conveyor, a second conveyor comprising a series of connected carriages each having mechanical clamping means, timed means causing said clamping means to grip to said mail pieces as they are delivered to the end of said first conveyor, means responsive to said detection devices causing said clamping means to rotate or not said mail pieces about a horizontal axis while transporting the pieces linearly, means causing said clamping means to release said pieces after a predetermined linear travel, a third conveyor receiving the mail pieces upon release thereof by said clamping means, a second stamp detection means scanning said pieces during transport by said third conveyor, a fourth conveyor comprising a series of connected carriages each having clamping means timed to receive the pieces as delivered by said fourth conveyor, means responsive to said second detection means causing the last named clamping means to rotate said pieces or not about a vertical axis while transporting said pieces linearly, means causing said last named clamping means to release said mail pieces after a predetermined travel, a fifth conveyor receiving said pieces as they are released by said last named clamping means, a third stamp detection device scanning the mail pieces during transport by said fifth conveyor, a gate associated with said fifth conveyor which when opened deflects the mail pieces from transport by said fifth conveyor and a stamp cancelling device associated with said fifth conveyor beyond said gate, and means responsive to said third detection devices opening or not said gate thereby separating the mail pieces for stamp cancellation from those not requiring stamp cancellation.

6. In a mail facing machine wherein mail pieces are to be rotated or not about a vertical and a horizontal axis whereby the stamp will always be maneuvered to a selected side and corner, an assembly for causing the rotation about a horizontal axis comprising a series of carriages connected together into a closed circuit, each of said carriages having parallel axles each having rollers at each end of each thereof, closed dual tracks supported by a frame defining the path of the rollers at each side of said carriages to form an upper flight and a lower flight, each of said carriages having mail piece clamping means carried thereby, a push rod which when depressed opens said clamping means to receive a mail piece, an elongated member having a cam surface fixed to said frame, said push rod contacting said cam surface and opening said clamps as each carriage arrives at the lower flight of said conveyor, spring means closing said clamping means upon loss of contact of said rod with said cam member, an elongated member mounted on said frame and having a second cam surface, a second push rod associated with said clamping means, said second push rod upon contact with the cam surface of said rocker arm rotating said clamping means about a horizontal axis, selective means locking said second push rod out of contact or not with said second cam surface, a third member fixed to said frame having a third cam surface, said first mentioned push rod contacting said third cam surface as said carriage approaches the end of the lower flight whereby said clamping means are caused to open, said first push rod returning the clamping means to closed position under actuation by a spring with loss of contact with said cam surface, and a fourth member fixed to said frame and having a cam surface in the path of said second push rod during its travel in the said upper flight, said fourth cam surface actuating said second push rod, if it has been rotated, to its original position.

7. In a mail facing machine wherein mail pieces are to be rotated or not about a vertical and a horizontal axis whereby the stamp will always be maneuvered to a selected side and corner, an assembly for causing rotation about a horizontal axis comprising a series of carriages each connected through links to an adjacent carriage, said carriages each having axles with rollers on the ends thereof, endless tracks for said rollers fixedly mounted on a frame and defining an upper and a lower flight, said carriages each having mail piece clamping means, a first push rod having a roller on one end thereof movable axially against one end of a bell crank, said bell crank being pivotally mounted on its carriage and being connected at its other end to one of a pair of clamping members, an elongated member terminating near the front end of said lower flight having a first cam surface over which said roller travels, thereby depressing said push rod and separating said clamping members to receive a mail piece, spring means returning said push rod upon loss of contact of said roller with said cam surface thereby closing said clamping members on said mail piece, a second push rod having a second roller on the upper end thereof movable axially against a spring, said second push rod having a rack on the lower end thereof in engagement with a pinion keyed to the other of said clamping members, a latching means retaining said second push rod in depressed position, a rocker arm pivotally mounted on said frame near the front end of said second flight selectively movable about its pivot, said rocker arm having a cam surface which engages and releases said latching means when rocked in one position and which fails to actuate said latching means when in its other position, another elongated member fixedly mounted on said frame having a third cam surface in the path of said second roller shaped to control the upward movement of said second push rod during its rotation of said other clamping member, another elongated member having a fourth cam surface engageable with the first named push rod near the end of its travel in the lower flight thus opening said clamping means and terminating at the beginning of the upper flight whereby said clamping means are closed, and an elongated member having a fifth cam surface secured to said frame beneath the upper flight, said fifth surface being in the path of said second push rod for depression thereof to latched position during travel of the carriage in said upper flight.

8. In a mail facing machine, a carriage for transport and rotation of mail pieces through 180° comprising a frame having spaced parallel axles each having rollers on the ends thereof, two opposed clamping members for receiving a mail piece therebetween, a push rod mounted on said frame for axial movement having a roller on one end and connected at its other end through a lever to one of said clamping members, said push rod upon actuation in one direction against a spring moving its clamping member away from the other clamping member, a second push rod mounted on said frame for axial movement having a roller on one end thereof and a rack on the other end thereof, said rack engaging a pinion keyed on the shaft of the other of said clamping members, both of said clamping members being rotatably mounted in said frame and both rotating in response to movement of said rack and pinion when gripping a mail piece therebetween.

9. In a mail facing machine, a carriage for transport and rotation of mail pieces through 180° comprising a frame having spaced parallel axles each having rollers on the ends thereof, two opposed clamping members for receiving a mail piece therebetween, a push rod mounted on said frame for axial movement having a roller on one end and connected at its other end through a lever to one of said clamping members, said push rod upon actuation in one direction against a spring moving its clamping member away from the other clamping member, a second push rod mounted on said frame for axial movement having a roller on one end thereof and a rack on the other end thereof, said rack engaging a pinion keyed on the shaft of the other of said clamping members, both of said clamping members being rotatably mounted in said frame and both rotating in response to movement of said rack and pinion, said second push rod when in depressed position causing latch member to engage, thus retaining it, a trip operable to disengage said latch members and a spring anchored to said frame at one end and to said push rod at its other end elevating said push rod upon release of said latch members.

10. In a mail facing machine wherein mail pieces are to be rotated or not about a horizontal and a vertical arc whereby the stamp will be maneuvered to a selected side and corner, an assembly for causing the rotation about a vertical axis comprising a series of carriages each connected to an adjacent carriage, each of said carriages having a frame and axles, said axles each having rollers on the ends thereof, endless tracks guiding said carriages in a path forming an upper and a lower flight, each of said carriages having mail piece clamping means, a first push rod having a roller on one end thereof and engageable through a train of members with bell-crank shaped clamping means pivotally mounted on a secondary frame, said push rod upon depression causing said clamping members to open for the reception of a mail piece, a spring connecting each clamping member to said secondary frame urging said clamping members together and also urging retraction of said push rod, a second push rod also having a roller on the end thereof and mounted in a guide on said frame, a member rotatable by said second push rod upon axial movement of said rod, said member being mounted on said frame and carrying said secondary frame whereby axial movement of said second push rod causes rotation of the clamping means carried by said secondary frame, and a spring urging retraction of said push rod in response to its depression.

11. In a mail facing machine, a carriage for the transport and rotation of mail pieces 180° about a vertical axis comprising a frame having spaced parallel axles each having rollers on the ends thereof, a secondary frame supporting the pivots of opposed bell-crank type clamping means, a spring connecting each of said bell-cranks with said secondary frame urging both ends thereof together, a shaft slidable in a bushing supported by said frame projecting through said secondary frame and operable to force the upper ends of said bell cranks apart thereby opening the lower ends thereof to receive mail pieces therebetween, said bushing having a helical groove on the exterior surface thereof and being rotatably mounted with respect to said frame, said bushing having said secondary frame mounted thereon for rotation therewith, a collar about said bushing having a land in engagement with said groove, a push rod mounted in a guide on said frame for movement parallel to the axis of said bushing, said push rod being rigidly connected to said collar for rotation of said bushing and said clamping means upon depression of said push rod, and spring means urging retraction of said push rod upon depression thereof.

References Cited in the file of this patent

UNITED STATES PATENTS

| | | |
|---|---|---|
| 81,004 | Read | Aug. 11, 1868 |
| 1,777,361 | Gottschalk | Oct. 7, 1930 |
| 1,824,432 | Hendry | Sept 22, 1931 |
| 1,914,806 | Hormel | June 20, 1933 |
| 1,984,962 | Brunn | Dec. 18, 1934 |
| 2,571,724 | Keeney | Oct. 16, 1951 |